United States Patent
Bienfang et al.

(10) Patent No.: US 8,959,805 B2
(45) Date of Patent: *Feb. 24, 2015

(54) MACHINE HAVING DIPPER ACTUATOR SYSTEM

(71) Applicant: Caterpillar Inc., Peoria, IL (US)

(72) Inventors: David Thomas Bienfang, Racine, WI (US); Carl Delbert Gilmore, South Milwaukee, WI (US); Frank Richard Szpek, Jr., Franklin, WI (US)

(73) Assignee: Caterpillar Inc., Peoria, IL (US)

( * ) Notice: Subject to any disclaimer, the term of this patent is extended or adjusted under 35 U.S.C. 154(b) by 100 days.

This patent is subject to a terminal disclaimer.

(21) Appl. No.: 13/748,352

(22) Filed: Jan. 23, 2013

(65) Prior Publication Data

US 2014/0202048 A1    Jul. 24, 2014

(51) Int. Cl.
E02F 3/30 (2006.01)
E02F 3/407 (2006.01)

(52) U.S. Cl.
CPC .................. *E02F 3/4075* (2013.01)
USPC .......................................................... 37/445

(58) Field of Classification Search
CPC ........ E02F 3/304; E02F 3/4075; E02F 3/425; E02F 3/308; E02F 3/40; F16D 55/00; F16D 2121/02
USPC ............ 37/444, 445, 442, 398; 414/726, 565, 414/715, 706, 699; 60/469; 188/312, 317, 188/217; 294/119.4, 192
See application file for complete search history.

(56) References Cited

U.S. PATENT DOCUMENTS

| | | | |
|---|---|---|---|
| 2,164,126 A | 6/1939 | Stevens | |
| 4,046,270 A | 9/1977 | Baron et al. | |
| 4,063,373 A * | 12/1977 | Greer et al. | 37/444 |
| 4,074,770 A | 2/1978 | Frisbee | |
| 4,517,756 A | 5/1985 | Olds et al. | |
| 5,829,949 A | 11/1998 | Brown | |
| 5,839,213 A | 11/1998 | Abbott et al. | |
| 6,219,946 B1 | 4/2001 | Suczka | |
| 6,467,202 B1 | 10/2002 | Brown, Jr. | |
| 7,096,610 B1 | 8/2006 | Gilmore | |
| 8,136,272 B2 | 3/2012 | Hren et al. | |
| 8,732,994 B2 * | 5/2014 | Dube et al. | 37/445 |
| 2011/0146114 A1 | 6/2011 | Hren et al. | |
| 2011/0239494 A1 | 10/2011 | Dubé et al. | |

OTHER PUBLICATIONS

Doll et al., Electric Mining Shovel Productivity Enhancements: Using Innovation to Increase machine Availability, date, pp. 1-7, Bucyrus International, 1100 Milwaukee Ave., South Milwaukee, WI, USA.

(Continued)

*Primary Examiner* — Robert Pezzuto
(74) *Attorney, Agent, or Firm* — Finnegan, Henderson, Farabow, Garrett & Dunner, LLP

(57) ABSTRACT

An actuator system for a machine includes a hydraulic actuator connected to a dipper of the machine, and a hydraulic system fluidly connected to the actuator and configured to selectively direct fluid to the actuator. A component of the hydraulic system is mounted on the dipper. The system also includes an overcenter link coupled to a door of the dipper and biased to maintain the door in a closed position. The actuator is operable to move the overcenter link in a first direction, thereby transitioning the door from the closed position to an open position.

20 Claims, 10 Drawing Sheets

(56) References Cited

OTHER PUBLICATIONS

U.S. Patent Application of David Thomas Bienfang et al., entitled "Power Shovel Having Isolated Hydraulic Dipper Actuator" filed on Jan. 23, 2013.

U.S. Patent Application of David Thomas Bienfang et al., entitled "Power Shovel Having Hydraulically Driven Dipper Actuator" filed on Jan. 23, 2013.

U.S. Patent Application of David Thomas Bienfang et al., entitled "Machine Having Dipper Actuator System" filed on Jan. 23, 2013.

* cited by examiner

MACHINE HAVING DIPPER ACTUATOR SYSTEM

TECHNICAL FIELD

The present disclosure is directed to a dipper actuator system and, more particularly, to a machine having a dipper actuator system.

BACKGROUND

Power shovels are in a category of excavation equipment used to remove large amounts of overburden and ore during a mining operation. One type of power shovel is known as a rope shovel. Another type of power shovel is known as a dredge, and dredges are typically used to remove material from below a waterline. A rope shovel includes a boom, a dipper handle pivotally connected to a mid-point of the boom, and a bucket (also known as a dipper) pivotally connected at one end of the dipper handle. A cable extends over a sheave at a distal end of the boom and terminates at the end of the dipper handle supporting the dipper. The cable is reeled in or spooled out by electric, hydraulic, and/or mechanical motors to selectively raise and lower the dipper.

In most rope shovels or dredges, the dipper includes a door that is selectively swung open to dump material from the dipper into a waiting haul vehicle. The door is pivotally connected at one edge to a dipper body, and mechanically latched at an opposing edge. A cable extends from an operator cabin over a boom-mounted sheave to the dipper latch. In this configuration, an operator can actuate the latch from inside a cabin of the shovel by tensioning the cable. When the dipper is held vertically, tensioning the cable causes the latch to release the door and the door falls open under the force of gravity. When the dipper is held horizontally, the door swings shut against the dipper body under the force of gravity, and the latch is biased to re-engage and hold the door in the closed position.

Although adequate for some applications, use of the cable to manually cause actuation of the dipper latch can be problematic. In particular, typical latches and associated cable linkages are under tremendous strain and cycle continuously. As a result, these components suffer high-cycle fatigue and must be serviced frequently to ensure that the latch operates effectively when manipulated by the operator via the cable. This frequent servicing results in machine downtime and lost productivity. Accordingly, an alternative source of control at the dipper latch is desired.

One attempt to improve durability of the dipper is disclosed in U.S. Pat. No. 8,136,272 that issued to Hren et al. on Mar. 20, 2012 ("the '272 patent"). Specifically, the '272 patent discloses a dipper door latch having a hydraulic cylinder that is remotely activated to selectively lock and unlock movement of the door. The cylinder is a double-acting cylinder having opposing chambers connected to each other by way of a closed loop. A solenoid operated valve, powered by a battery pack located at the dipper, controls fluid flow between the chambers in response to a remotely-transmitted signal from the operator. An accumulator is connected to the loop to accommodate volume differences between the chambers.

Although the dipper door latch of the '272 patent may have improved durability because it no longer requires mechanical connection to the cab of the power shovel, it may still be problematic. In particular, the double-acting nature of the cylinder increases a complexity of the latch and the potential for malfunction. Further the location and configuration of the latch and hydraulic cylinder could result in elevated wear.

The exemplary embodiments of the present disclosure solve one or more of the problems set forth above.

SUMMARY

In an exemplary embodiment of the present disclosure, an actuator system for a machine includes a hydraulic actuator connected to a dipper of the machine, and a hydraulic system fluidly connected to the actuator and configured to selectively direct fluid to the actuator. A component of the hydraulic system is mounted on the dipper. The system also includes an overcenter link coupled to a door of the dipper and biased to maintain the door in a closed position. The actuator is operable to move the overcenter link in a first direction, thereby transitioning the door from the closed position to an open position.

In another exemplary embodiment of the present disclosure, an actuator system for a machine includes one of a linear and a rotary hydraulic actuator associated with a dipper of the machine. The dipper includes a body having a front side including an excavation opening, a back side opposite the front side, a top surface, and a door. The door is moveable between a closed position in which the door is disposed adjacent to the back side and an open position in which the door is disposed away from the back side. The one of the linear and the rotary hydraulic actuator is mounted on the top surface. Additionally, the dipper is connected to the machine via a boom extending from the machine, and via a dipper handle pivotally connected to a midpoint of the boom. The system also includes a hydraulic system having a component disposed on the dipper. The hydraulic system is configured to selectively direct fluid to the one of the linear and the rotary hydraulic actuator in response to a control signal received from an operator of the machine. The system also includes an overcenter link connected to the door, and an eccentric link connected to the overcenter link and the top surface. Selectively directing fluid to the one of the linear and the rotary hydraulic actuator moves the eccentric link and the overcenter link relative to the body, and transitions the door between the open and closed positions.

In a further exemplary embodiment of the present disclosure, a method of operating a machine includes selectively directing fluid between a hydraulic system, having a component disposed on a dipper of the machine, and a hydraulic actuator disposed on the dipper. In such a method, selectively directing fluid between the hydraulic system and the hydraulic actuator activates the hydraulic actuator. The method also includes moving an overcenter link, in response to activation of the hydraulic actuator, in a first direction to transition a door of the dipper connected to the overcenter link to an open position in which the door is disposed away from a body of the dipper. In such a method, activation of the hydraulic actuator overcomes a biasing force maintaining the door in a closed position in which the door is disposed adjacent to the body.

BRIEF DESCRIPTION OF THE DRAWINGS

FIG. 5 is an illustration of another exemplary disclosed actuator system associated with the machines of FIGS. 1 and 1a;

FIG. 6 is an illustration of still another exemplary disclosed actuator system associated with the machines of FIGS. 1 and 1a;

FIG. 8 is an exploded view of a portion of another exemplary actuator system configured for use with the machines of FIGS. 1 and 1a;

FIG. 9 is an illustration of another exemplary disclosed actuator system associated with the machines of FIGS. 1 and 1a;

FIG. 11 is an illustration of still another exemplary disclosed actuator system associated with the machines of FIGS. 1 and 1a.

DETAILED DESCRIPTION

Figure 1:
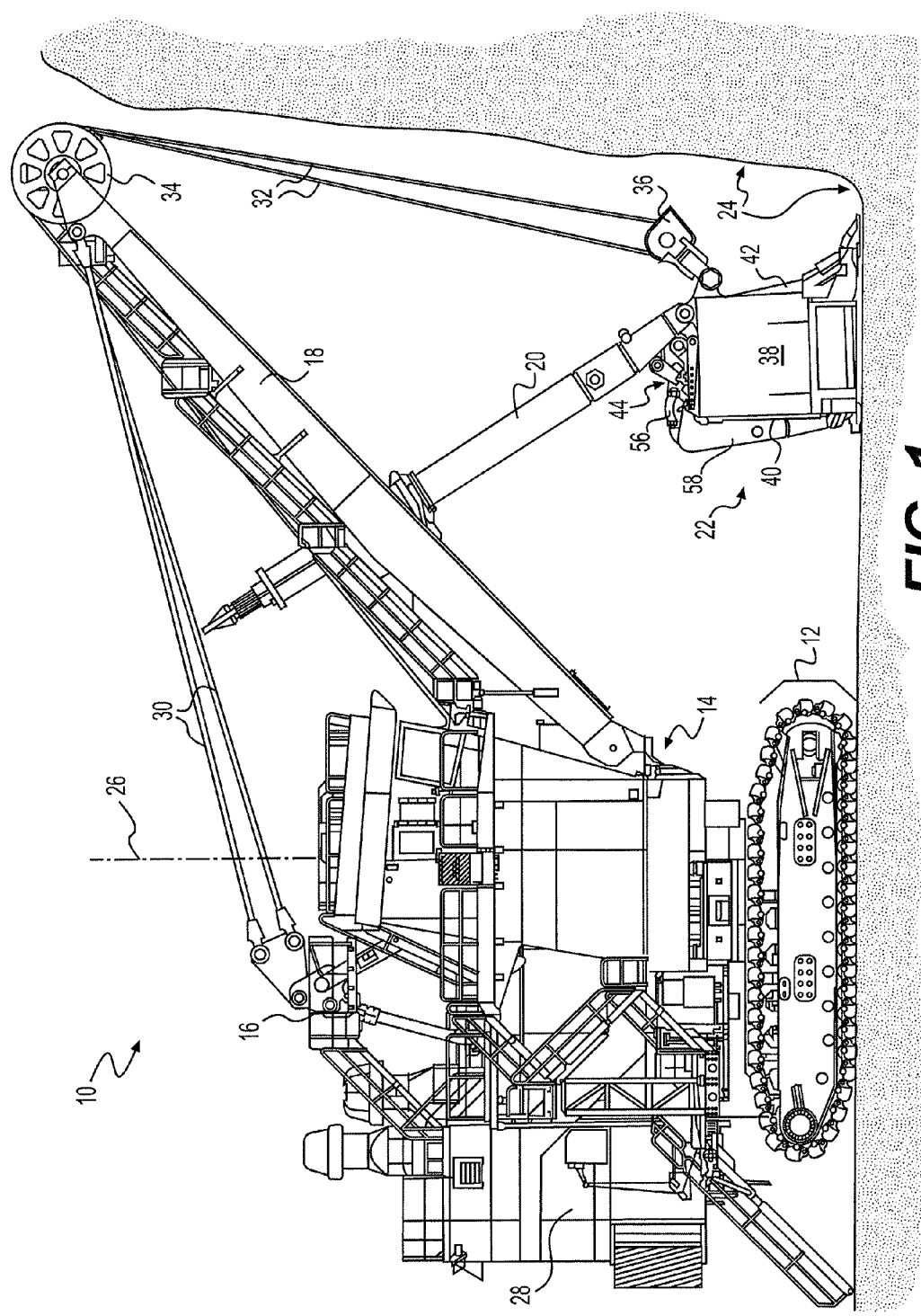
FIG. 1 is a diagrammatic illustration of an exemplary disclosed machine.
Figure 1A:
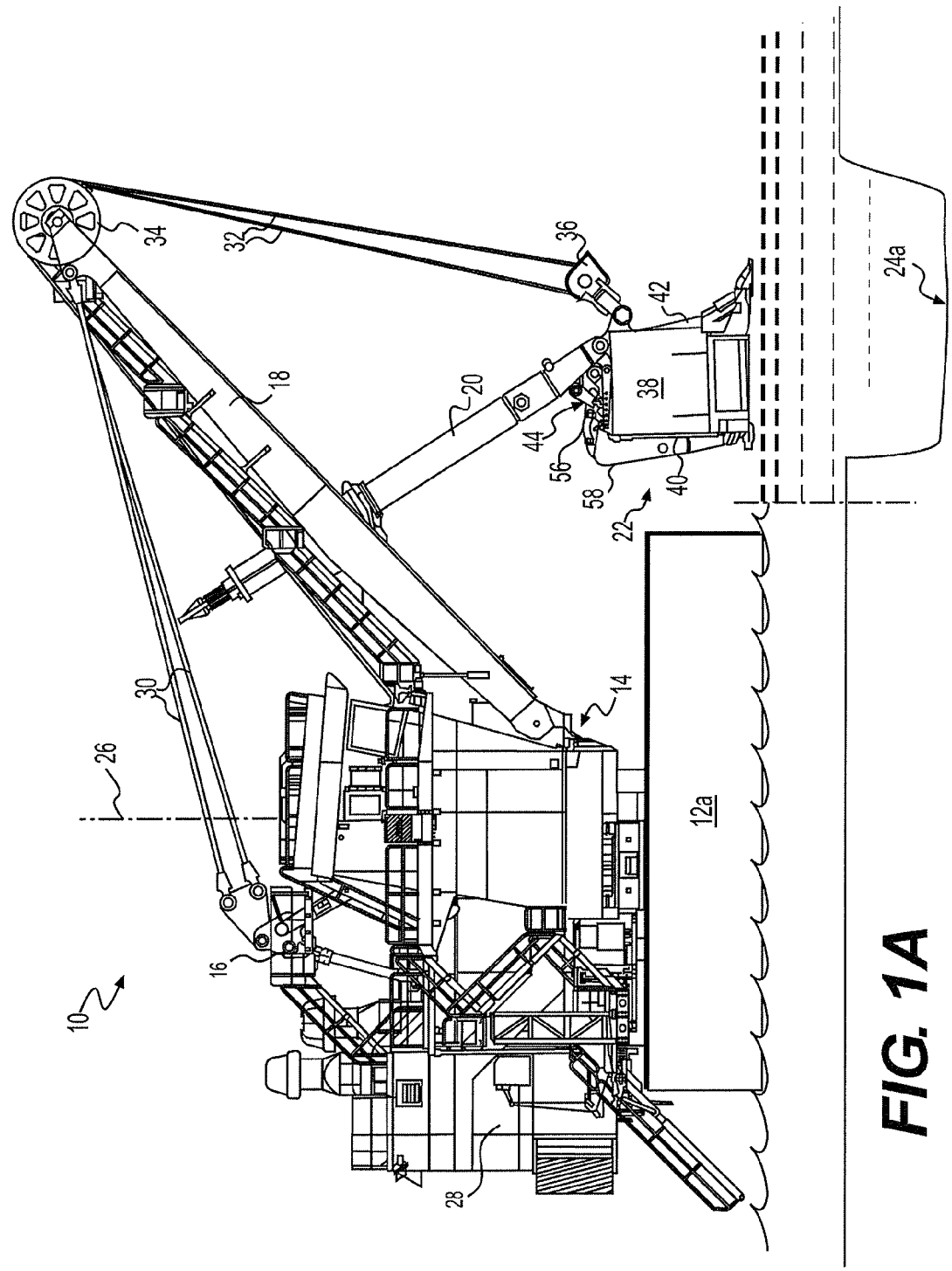
FIG. 1a is a diagrammatic illustration of another exemplary disclosed machine.

FIGS. 1 and 1a illustrate exemplary embodiments of a machine 10. Machine 10 may perform any type of operation associated with an industry such as mining, construction, excavation, or any other industry known in the art. For example, machine 10 may embody an earth moving machine such as the power shovel depicted in FIG. 1 or the dredge depicted in FIG. 1a. In the exemplary embodiment of FIG. 1, machine 10 may include a base 12, a body 14 operatively connected to base 12, a gantry member 16 rigidly mounted to a top side of body 14 opposite base 12, a boom 18 pivotally connected to a leading end of body 14, a dipper handle 20 pivotally connected to a midpoint of boom 18, a tool 22 pivotally connected to a distal end of dipper handle 20, and cabling connecting gantry member 16, boom 18, dipper handle 20, and tool 22. In the exemplary embodiment of FIG. 1a, machine 10 may include each of the components noted above, except that base 12 may be placed with a barge 12a configured to support machine 10 in aqueous and/or semi-aqueous environments.

Base 12 (or barge 12a) may be a structural unit that supports movements of machine 10. In the disclosed exemplary application, base 12 is itself movable, having one or more traction devices such as feet, tracks (shown in FIG. 1), and/or wheels that are driven to propel machine 10 over a work surface 24. In other applications, however, base 12 may be a stationary platform configured for fixed engagement with work surface 24. As shown in FIG. 1a, in still further embodiments, barge 12a may be stationary and/or moveable over a body of water, and a work surface 24a may embody an underwater trench and/or other like underwater surface. In exemplary embodiments, at least a portion of barge 12a may be configured for fixed engagement with an underwater surface proximate work surface 24a.

Body 14 may pivot relative to base 12 or barge 12a (FIG. 1a). Specifically, body 14 may pivot relative to base 12 or barge 12a about a substantially vertical axis 26. As body 14 is pivoted about axis 26, attached gantry member 16, boom 18, dipper handle 20, and tool 22 may likewise pivot to change a radial engagement angle of tool 22 with work surface 24, 24a. In the exemplary embodiment of FIG. 1, tool 22 typically engages with the vertical portion of work surface 24, and the horizontal portion of work surface 24 may be formed as a result of such engagement. The horizontal portion of work surface 24 may be removed by tool 22 in subsequent passes and/or by additional machines located proximate word surface 24. Alternatively, in the exemplary embodiment of FIG. 1a, tool 22 may engage a working face and/or other portion of work surface 24a disposed below the waterline (i.e., underwater). Body 14 may house, among other things, a power source 28 that powers the movements of machine 10. For ease of description, the exemplary embodiment of FIG. 1 will be referred to for the duration of this disclosure unless otherwise specified. It is understood, however, that the exemplary actuator systems and/or other components described herein, as well as their respective methods of operation, may be used with the machines 10 (i.e., the power shovel of FIG. 1 and the dredge of FIG. 1a) illustrated in either of FIGS. 1 and 1a.

Gantry member 16 may be a structural frame member, for example a general A-frame member, that is configured to anchor one or more cables 30 to body 14. Gantry member 16 may extend from body 14 in a vertical direction away from base 12. Gantry member 16 may be located rearward of boom 18 relative to tool 22 and, in the disclosed exemplary embodiment, fixed in a single orientation and position. Cables 30 may extend from an apex of gantry member 16 to a distal end of boom 18, thereby transferring a weight of boom 18, tool 22, and a load contained within tool 22 into body 14.

Boom 18 may be pivotally connected at a base end to body 14, and constrained at a desired vertical angle relative to work surface 24 by cables 30. Additional cables 32 may extend from body 14 over a sheave mechanism 34 located at the distal end of boom 18 and around a sheave mechanism 36 of tool 22. Cables 32 may connect tool 22 to body 14 by way of one or more motors and/or transmissions coupled to a drum (not shown), such that a rotation of the motors (and/or transmissions coupled to a drum) functions to reel in or spool out cables 32. The reeling in and spooling out of cables 32 may affect the height and angle of tool 22 relative to work surface 24. For example, when cables 32 are reeled in, the decreasing effective length of cables 32 may cause tool 22 to rise and tilt backward away from work surface 24. In contrast, when cables 32 are spooled out, the increasing effective length of cables 32 may cause tool 22 to lower and tilt forward toward work surface 24.

Dipper handle 20 may be pivotally connected at one end to a general midpoint of boom 18, and at an opposing end to a corner of tool 22 adjacent sheave mechanism 36 (e.g., rearward of sheave mechanism 36). In this position, dipper handle 20 may function to maintain a desired distance of tool 22 away from boom 18 and ensure that tool 22 moves through a desired arc as cables 32 are reeled in and spooled out. In the disclosed embodiment, dipper handle 20 may be connected to boom 18 at a location closer to the base end of boom 18, although other configurations are also possible. In some configurations, dipper handle 20 may be provided with a crowd cylinder (not shown) that functions to extend or retract dipper handle 20. In this manner, the distance between tool 22 and boom 18 (as well as the arcuate trajectory of tool 22) may be adjusted.

Tool 22, in the exemplary embodiments of the present disclosure, is known as a "dipper," and the terms "tool 22" and "dipper" may be used interchangeably throughout this disclosure. A dipper is a type of shovel bucket having a dipper body 38, and a dipper door 40 located at a back side of dipper body 38 opposite a front side excavation opening 42. Dipper door 40 may be hinged along a base edge at the back side of dipper body 38, so that it can be selectively pivoted to open and close dipper body 38 during an excavating operation. Dipper door 40 may be pivoted between the open and closed positions by gravity, and held closed or released by way of an actuator system 44. For example, when tool 22 is lifted upward toward the distal end of boom 18 by reeling in of cables 32, a releasing action of actuator system 44 may allow the weight of dipper door 40 (and any material within tool 22) to swing dipper door 40 downward toward work surface 24 and away from dipper body 38. This motion may allow material collected within tool 22 to spill out the back side of dipper body 38. In contrast, when tool 22 is lowered toward work surface 24, the weight of dipper door 40 may cause dipper door 40 to swing back toward dipper body 38. Actuator system 44 may then be caused to lock dipper door 40 in its closed position.

In the disclosed embodiments, actuator system 44 may be remotely controlled, such as by way of an electric signal, a hydraulic signal, a pneumatic signal, a radio signal, a wireless signal, or another type of signal known in the art. It is contemplated, however, that a cable may alternatively be mechanically connected to and used to activate actuator system 44, if desired.

Figure 2:
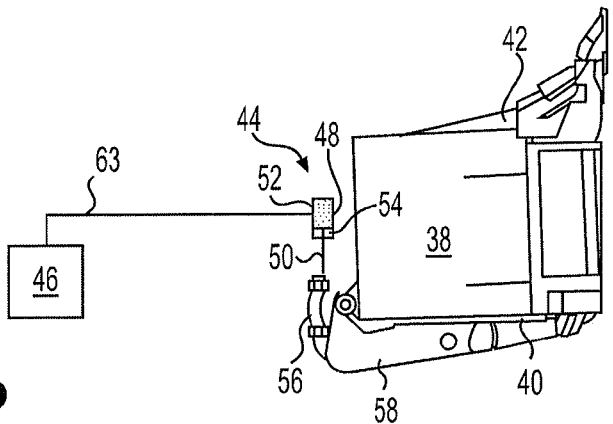
FIG. 2 is a diagrammatic illustration of an exemplary disclosed actuator system associated with the machines of FIGS. 1 and 1a, the actuator system being in a closed position.
Figure 3:
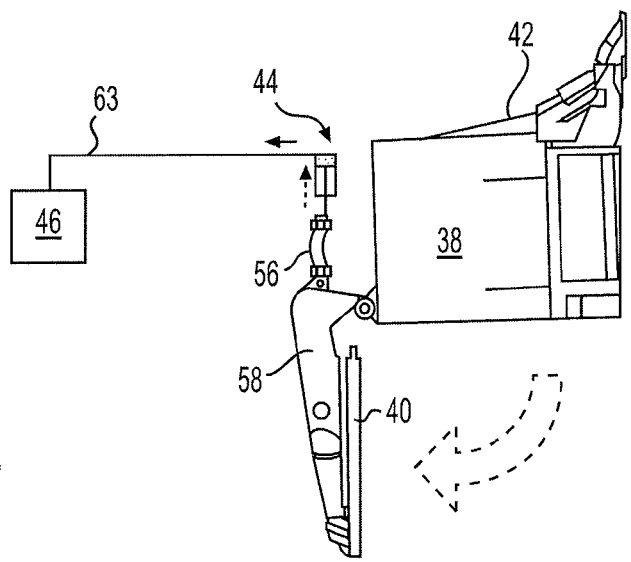
FIG. 3 is another diagrammatic illustration of the actuator system shown in FIG. 2, the actuator system being in an open position.
Figure 4:
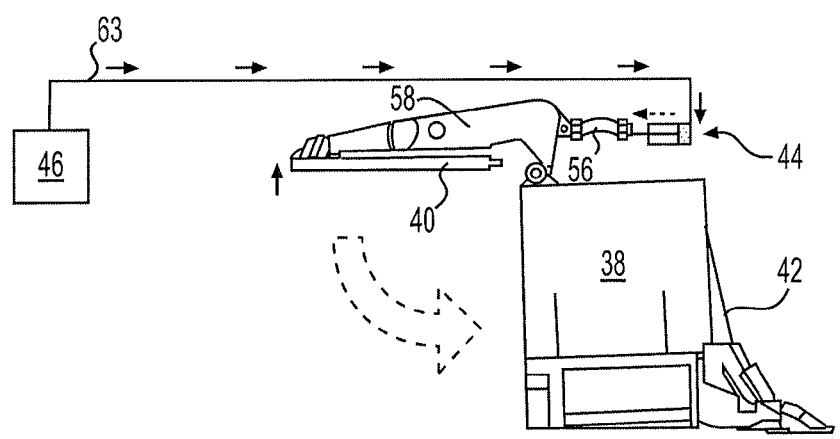
FIG. 4 is a further diagrammatic illustration of the actuator system shown in FIG. 2, the actuator system being transitioned to the closed position.

FIGS. 2-4 provide partial schematic illustrations of actuator system 44 in use to open and close dipper door 40. Additional exemplary embodiments of actuator system 44 will be described in greater detail below with respect to FIGS. 5-11. As shown in FIG. 2, actuator system 44 may include a powered type of hydraulic actuator that forms a part of and/or that is fluidly connected to an isolated hydraulic system 46 located at and, in some embodiments, mounted to tool 22. For purposes of this disclosure, actuator system 44 may be construed as including hydraulic system 46 and/or various components thereof. For example, actuator system 44 may include one or more linear hydraulic actuators, such as hydraulic cylinders. Actuator system 44 may also include one or more rotary hydraulic actuators, such as hydraulic motors. The hydraulic actuators of actuator system 44 may be selectively activated to initiate opening of dipper door 40 and/or to assist in closing and/or locking dipper door 40 in the closed position. Hydraulic system 46 may be considered an isolated system, as it may be self-contained and self-powered, not requiring fluid connection or powered support from other components or systems within base 12 or body 14 of machine 10.

In the exemplary partial schematic illustrations of FIGS. 2-4, actuator system 44 is shown as including a single-acting linear hydraulic actuator (i.e., a hydraulic cylinder) operatively connected between dipper body 38 and the base edge of dipper door 40. In such exemplary embodiments, the linear hydraulic actuator of actuator system 44 includes a tube 48, and a piston assembly 50 disposed within tube 48 to form a head-end chamber 52 and a rod-end chamber 54. One of tube 48 and piston assembly 50 may be pivotally connected to dipper body 38, while the other may be pivotally connected to dipper door 40 by way of one or more eccentric links 56 and an overcenter link 58 that is coupled to eccentric links 56. In exemplary embodiments, such links 56, 58 may also be construed as components of actuator system 44.

As a single-acting cylinder, only one of head-end chamber 52 and rod-end chamber 54 may ever be filled with hydraulic fluid. In the exemplary configuration shown in FIG. 2, head-end chamber 52 functions as the sole pressure chamber for the linear actuator. As door 40 opens under the force of gravity (see FIG. 3), piston assembly 50 may be forced to retract into tube 48, thereby discharging any fluid within head-end chamber 52 at high-pressure from the linear actuator. In contrast, as door 40 closes under the force of gravity (see FIG. 4), piston assembly 50 may be forced to extend from tube 48, thereby drawing low-pressure fluid into head-end chamber 52. It is contemplated that rod-end chamber 54 could alternatively function as the sole pressure chamber for the linear actuator (e.g., when the orientation of the linear actuator is reversed), if desired. It is further contemplated that actuator system 44 could alternatively include a double-acting linear actuator or a double-acting rotary actuator. It should be noted that, in some embodiments, more than one substantially identical linear or rotary hydraulic actuators may be associated with a single tool 22. In these embodiments, the hydraulic actuators may be disposed in parallel and controlled simultaneously to cooperatively open and close dipper door 40.

Hydraulic system 46 may include additional components that interact with actuator system 44 to selectively allow or block movement of dipper door 40, as well as recuperate energy associated with the movement. In particular, although not illustrated in FIGS. 2-4, in exemplary embodiments hydraulic system 46 may include a low-pressure reservoir, an accumulator, and/or one or more control valves disposed between actuator system 44, the reservoir, and the accumulator. Such a low-pressure reservoir may be fluidly connected to actuator system 44 via a supply passage 63, while such a control valve may be fluidly connected to actuator system 44 via one or more additional passages (not shown) such as a control or return passage. The control valve may also be fluidly connected to the accumulator and the reservoir via a high-pressure passage and a low-pressure passage (not shown), respectively. Such components may provide a supply of pressurized fluid to and may receive pressurized fluid from actuator system 44 to assist in opening and closing dipper door 40. For example, the control valve may include a valve element movable between different positions to selectively allow fluid to flow between head-end chamber 52, accumulator, and reservoir. For example, the valve element may be movable from a first position (associated with dipper door 40 being in the closed position shown in FIG. 2), at which fluid flow between head-end chamber 52, accumulator, and reservoir, via control valve, may be inhibited, to a second flow-passing position (associated with dipper door 40 being in the open position shown in FIG. 3) or a third flow-passing position (associated with the dipper door 40 returning to the closed position as shown in FIG. 4).

Movement of the valve element described above with respect to hydraulic system 46 may be controlled to regulate operation of actuator system 44 and tool 22. Specifically, the valve element may be solenoid-operable to move from the first position described above with respect to FIG. 2, to either of the second or third flow-passing positions based on a wired or wirelessly transmitted control signal generated by an operator of machine 10. In exemplary embodiments, the valve element may be spring-biased toward the first position. When the valve element is moved to the first position (referring to FIG. 2) and all fluid flow through the associated control valve of hydraulic system 46 is inhibited, actuator system 44 may be hydraulically locked. That is, fluid within head-end chamber 52 may be trapped when the valve element is in the first position, thereby blocking extension and retraction of piston assembly 50. When dipper door 40 is closed and actuator system 44 is hydraulically locked, it may not be possible for dipper door 40 to open.

Further, due to interaction between overcenter link 58 and eccentric link 56, and/or between overcenter link 58 and other dipper door linkages, overcenter link 58 may be biased to maintain dipper door 40 in the closed position shown in FIG. 2. In particular, the limited path of travel, shape, size, and/or other configurations of eccentric link 56, alone or in combination with other dipper door linkages, may assist in providing a mechanical advantage and/or other like biasing force to overcenter link 58 while dipper door 40 is in the closed position. Such mechanical advantage and/or other like biasing force may assist in maintaining dipper door 40 in the closed position until this biasing force is overcome by actuator system 44.

In contrast, when the valve element of hydraulic system 46 is moved to the second flow-passing position (referring to FIG. 3), actuator system 44 may no longer be hydraulically locked. In this state, when dipper body 38 is oriented upward (i.e., such that excavation opening 42 is oriented away from work surface 24) and the force of dipper door 40 (and any material contained within dipper body 38) urges dipper door 40 to rotate clockwise (as viewed in FIG. 3) toward work surface 24, piston assembly 50 may be forced to retract within tube 48 and push fluid out of head-end chamber 52 at high pressure. This high-pressure fluid, containing significant potential energy in the form of pressure, may be directed from the hydraulic actuator of actuator system 44, through the control valve, and into hydraulic system 46 where it may be collected and stored for later use.

When the valve element of hydraulic system 46 is moved to the third flow-passing position and dipper body 38 is oriented forward (e.g., rotated about 90° clockwise from the upward orientation), the gravitational force acting on dipper door 40 may urge dipper door 40 to rotate counterclockwise (as viewed in FIG. 4), causing piston assembly 50 to extend from tube 48 and draw in fluid from hydraulic system 46 via supply passage 63. In further exemplary embodiments, such valve element movement, positions, fluid flow directions, and/or other operations of hydraulic system 46 may be reversed such that hydraulic system 46 may direct pressurized fluid to actuator system 44 to assist in, for example, transitioning dipper door 40 from the closed position illustrated in FIG. 2 to the open position illustrated in FIG. 3.

It is understood that components of hydraulic system 46 may additionally be used as a "snubber" for actuation system 44, if desired. In particular, in some embodiments, the control valve described above may be moveable to a position between the first and second positions (shown in FIGS. 2 and 3, respectively) and/or to a position between the first and third positions (shown in FIGS. 2 and 4, respectively). In either of these intermediate positions, the flow of fluid from head-end chamber 52 and/or into head-end chamber 52 may be metered to a rate that effectively slows and cushions the pivoting movement of dipper door 40. Further, although the operation of actuator system 44 and hydraulic system 46 have been described above with respect to the linear hydraulic actuator shown in FIGS. 2-4, in exemplary embodiments in which actuator system 44 comprises one or more rotary hydraulic actuators, the operation of actuator system 44 and hydraulic system 46 may be substantially identical to that described above.

The embodiments shown in FIGS. 5-11 illustrate various additional exemplary actuator systems 44 configured for use with machine 10. Although not illustrated in FIGS. 5-11, it is understood that hydraulic system 46 may be fluidly, operably, and/or otherwise connected to the various actuators of actuator system 44, and configured to selectively direct fluid, such as such as oil, hydraulic fluid, and/or other incompressible working fluids, to the various actuators. In such exemplary embodiments, at least one component of hydraulic system 46 may be disposed and/or otherwise mounted on tool 22.

Figure 5:
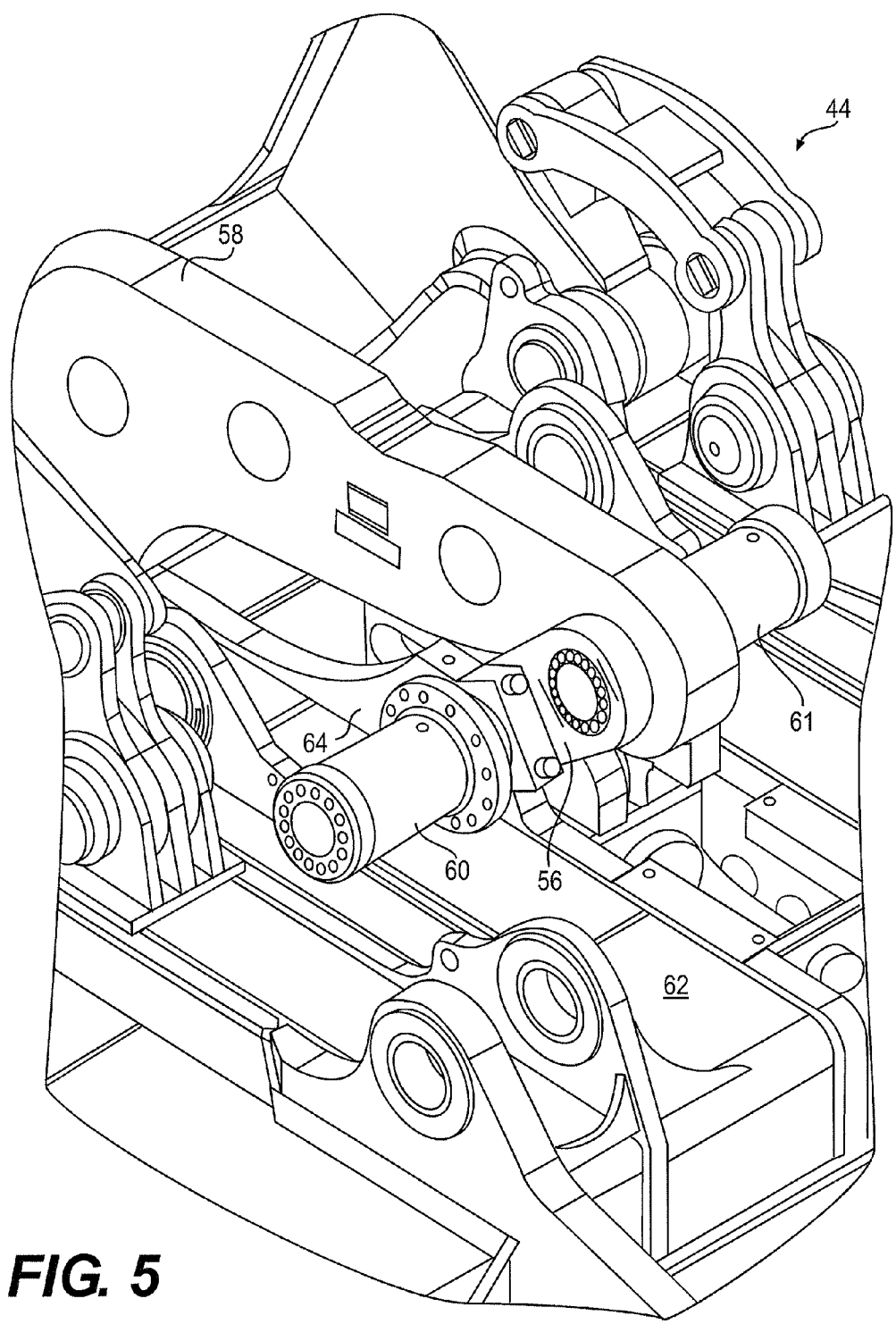

As shown in FIG. 5, an exemplary embodiment of actuator system 44 may comprise one or more rotary actuators 60, 61. As described above, overcenter link 58 may be coupled to tool 22 (i.e., the dipper of machine 10) via eccentric link 56, and in the embodiment of FIG. 5, a first rotary actuator 60 may be connected to a first eccentric link 56 disposed on a first side of overcenter link 58. Additionally, a second rotary actuator 61 may be connected to a second eccentric link 56 (not shown) disposed on a second side of overcenter link 58 opposite the first side.

Rotary actuators 60, 61, like the hydraulic linear actuators described above, may be driven by a fluid pressure differential. Specifically, each of rotary actuators 60, 61 may comprise any known hydraulic motor and/or other like rotary hydraulic device. For example, each of rotary actuators 60, 61 may include first and second chambers (not shown) located to either side of a pumping mechanism, such as an impeller, plunger, or series of pistons (not shown). When the first chamber is filled with pressurized fluid and the second chamber is drained of fluid, the pumping mechanism may be urged to move or rotate in a first direction. Conversely, when the first chamber is drained of fluid and the second chamber is filled with pressurized fluid, the pumping mechanism may be urged to move or rotate in an opposite direction. The flow rate of fluid into and out of the first and second chambers, such as between rotary actuators 60, 61 and hydraulic system 46, may determine a rotational velocity of the corresponding rotary actuator 60, 61, while a pressure differential across the pumping mechanism may determine an output torque. It is contemplated that a displacement of each of rotary actuators 60, 61 may be variable, if desired, such that for a given flow rate and/or pressure of supplied fluid, a rotational speed and/or output torque of the respective rotary actuator 60, 61 may be adjusted.

With continued reference to the embodiment of FIG. 5, rotary actuators 60, 61 may each include an output shaft (illustrated in FIGS. 7 and 8) coupled directly to the respective eccentric links 56, such that rotation of the output shaft, in either the clockwise or counterclockwise direction, may result in corresponding movement of the eccentric link 56 connected thereto. In the exemplary embodiment of FIG. 5, rotation of the eccentric links 56 resulting from activation of rotary actuators 60, 61 may cause corresponding movement of overcenter link 58. For example, rotation of eccentric link 56 shown in FIG. 5 in a counterclockwise direction, as viewed from the perspective of FIG. 5, may result in movement of overcenter link 58 in a first direction. It is understood that movement of overcenter link 58 in such a first direction may comprise one or more of linear, arcuate, rotational, pivotal, and/or other like movement of overcenter link 58. For example, movement of overcenter link 58 may be governed by the connection between overcenter link 58, eccentric link 56, and the various other linkages illustrated but not explicitly labeled in FIG. 5. Accordingly, movement of overcenter link 58 in such a first direction may be characterized generally as movement toward the back side of dipper body 38 and/or away from front side excavation opening 42 (FIG. 1). In exemplary embodiments, such movement in the first direction may transition dipper door 40 from the closed position described above in which dipper door 40 is disposed adjacent to the back side of dipper body 38 to the open position in which dipper door 40 is disposed away from the back side of dipper body 38. Further, in some embodiments, such movement of overcenter link 58 in the first direction may comprise a combination of one or more movements. Such a combination of movements may be required to overcome the mechanical advantage and/or other biasing force applied to overcenter link 58 by, for example, eccentric link 56, and may comprise a pivoting and/or rotational movement of overcenter link 58 toward the back side of dipper body 38 as the eccentric link 56 shown in FIG. 5 rotates counterclockwise, as well as an arcuate and/or substantially linear movement away from a top surface 62 of dipper body 38 and/or toward front side excavation opening 42 when dipper door 40 swings open.

As shown in FIG. 5, eccentric link 56 may be rotatably coupled to overcenter link 58, and may be coupled to top surface 62 via one or more flanges 64 projecting from top surface 62. Flange 64 may project substantially perpendicularly from top surface 62 and may have any shape, size, and/or other configuration required to assist in securing eccentric link 56 to top surface. In exemplary embodiments, one or more bearings, bushings, washers, and/or other like components may be disposed at the interface between eccentric link 56 and flange 64 to assist in rotation of eccentric link 56 relative to flange 64 while minimizing friction and/or wear caused by such relative motion. Flange 64 may also comprise one or more thru holes (not shown) configured to accept a component of a respective rotary actuator 60, 61, such as the output shaft described above. In such exemplary embodiments, the respective rotary actuator 60, 61 may be fixedly coupled to flange 64 to assist in rotating a corresponding eccentric link 56 relative to flange 64. In the exemplary embodiment of FIG. 5, overcenter link 58 may be movably connected to the dipper via first and second eccentric links 56, and in such an embodiment, first rotary actuator 60 may be directly connected to the corresponding first eccentric link 56 via an output shaft of rotary actuator 60. Likewise, in such an embodiment, second rotary actuator 61 may be directly connected to the corresponding second eccentric link 56 via an output shaft of rotary actuator 61 in parallel with first rotary actuator 60. Such parallel connection between first and second rotary actuators 60, 61 may enable first rotary actuator 60 to rotate first eccentric link 56 simultaneously with and/or otherwise in parallel with second rotation of second eccentric link 56 by second rotary actuator 61.

Figure 6:
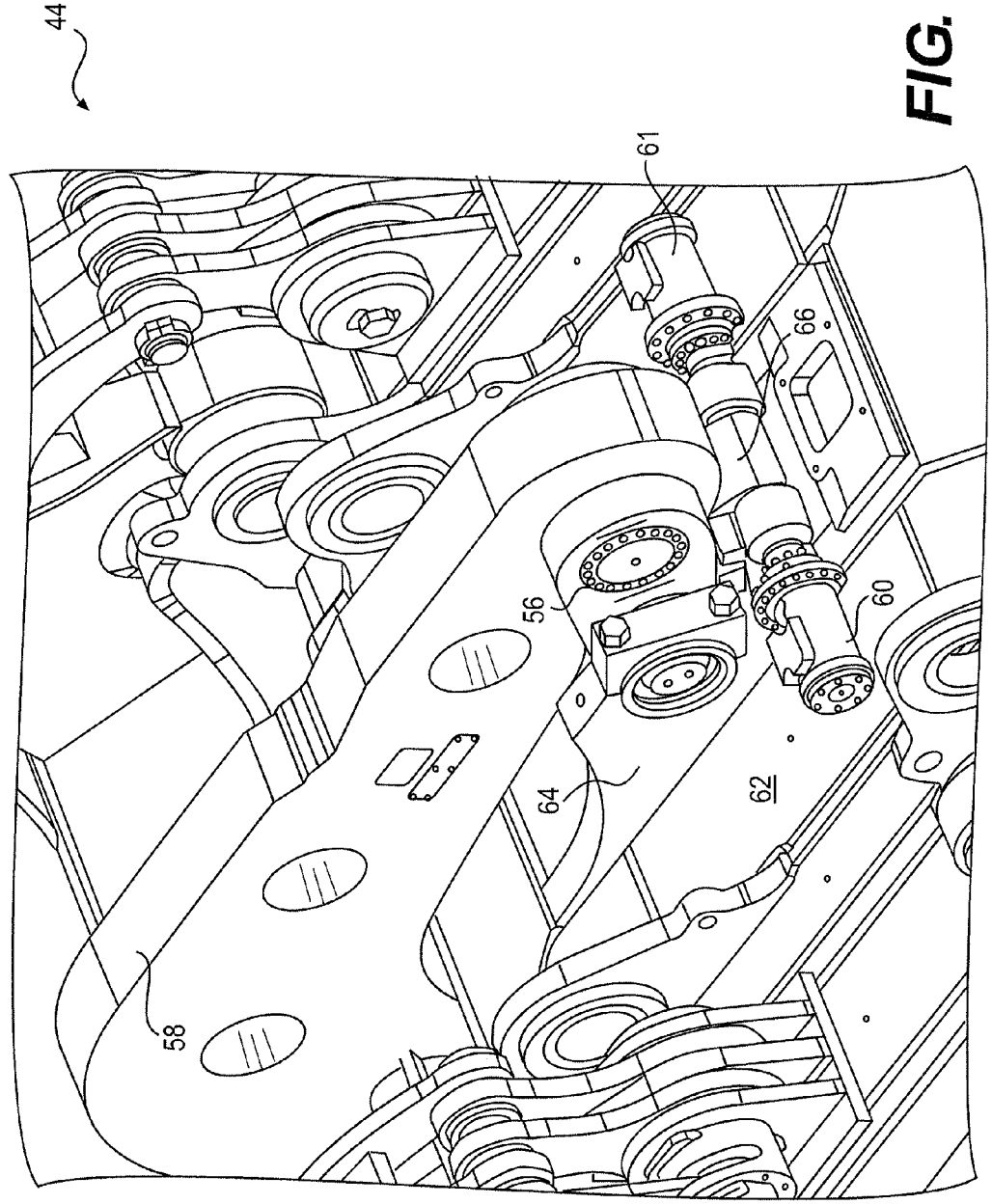
Figure 7:
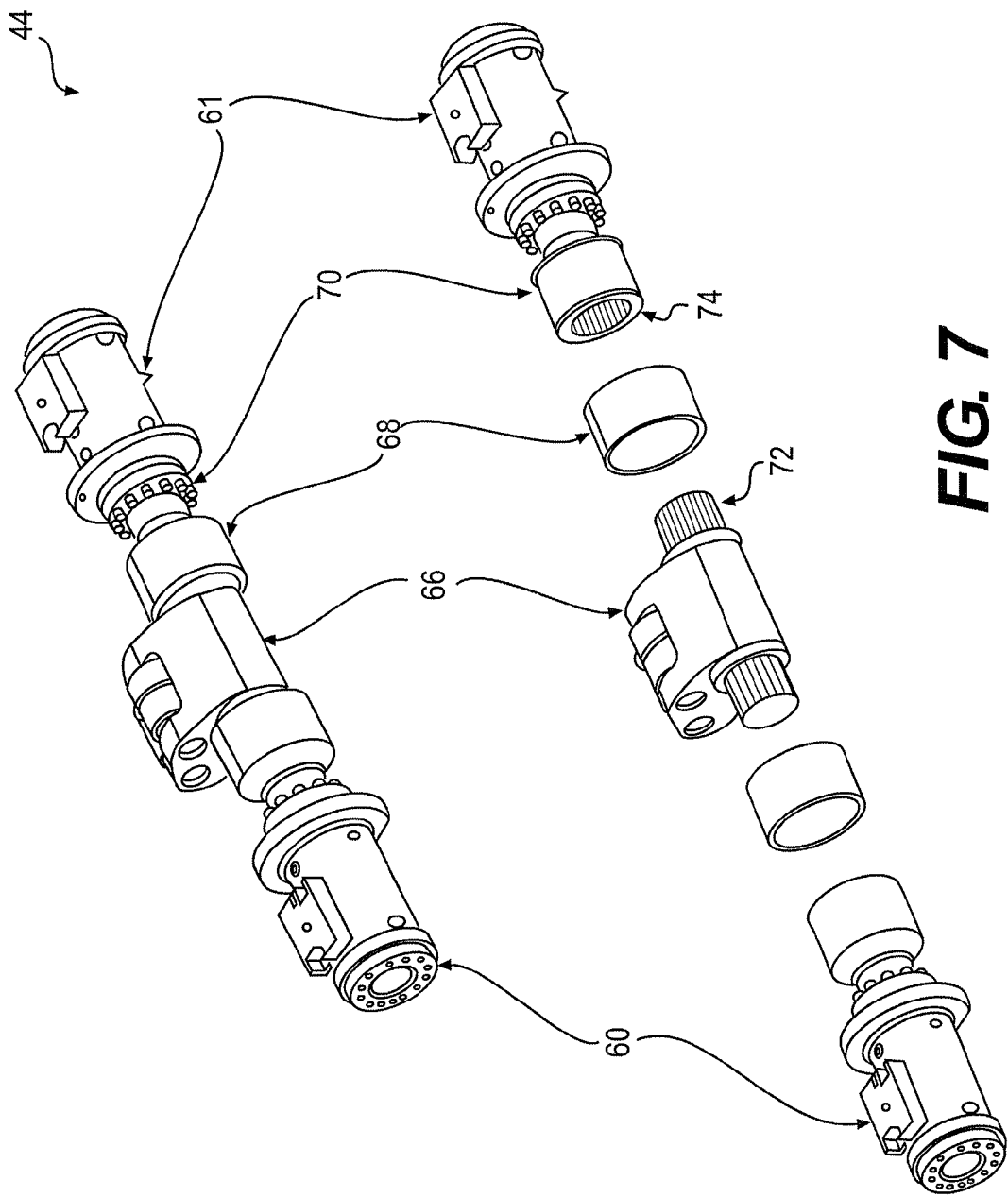
FIG. 7 is an exploded view of a portion of the exemplary actuator system shown in FIG. 6.
Figure 8:
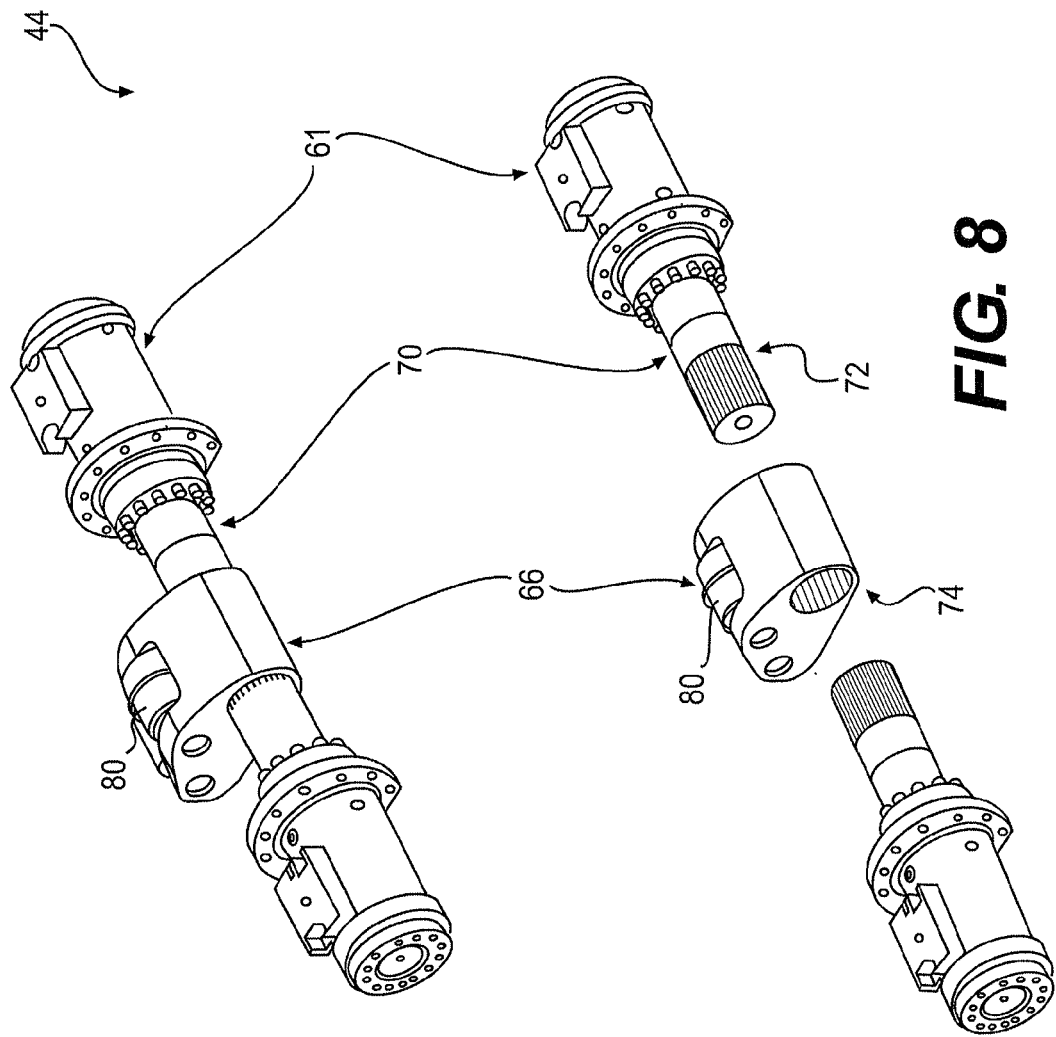

As shown in FIGS. 6-8, in another exemplary embodiment, actuator system 44 may include first and second rotary actuators 60, 61 configured to rotate a cam 66 against overcenter link 58 to thereby transition dipper door 40 between the closed and open positions. For example, as viewed from the perspective of FIG. 6, rotation of an output shaft of rotary actuator 60 in the counterclockwise direction, in parallel with commensurate rotation of an output shaft of rotary actuator 61, may rotate cam 66 along and/or otherwise against a surface of overcenter link 58. Such movement of cam 66 against overcenter link 58 may cause overcenter link 58 to move in the first direction described above, thereby transitioning dipper door 40 from the closed position to the open position.

FIG. 7 illustrates an exploded view of a portion of the exemplary actuator system 44 shown in FIG. 6. As shown in FIG. 7, in an exemplary embodiment, first rotary actuator 60 may be connected to a first side of cam 66, and second rotary actuator 61 may be connected to a second side of cam 66 opposite the first side. For example, an output shaft 70 of each rotary actuator 60, 61 may be coupled to a corresponding spline 72 disposed on respective first and second sides of cam 66. In the exemplary embodiment shown in FIG. 7, splines 72 of cam 66 may comprise male threads, protrusions, and/or other like structures configured to mate with corresponding structures formed in a cavity 74 of respective output shafts 70. Actuator system 44 may also include one or more bushings 68 or other like structures configured to assist in coupling output shafts 70 with splines 72 of cam 66.

As shown in FIG. 8, in additional exemplary embodiments, output shafts 70 of rotary actuators 60, 61 may comprise splines 72 similar to splines 72 described above with respect to FIG. 7. In the embodiment of FIG. 8, cam 66 may comprise a corresponding cavity 74 including threads, protrusions, and/or other like structures configured to mate with corresponding structures formed on respective splines 72. Since, in the embodiment of FIG. 8, cavity 74 of cam 66 may be configured to accept output shafts 70 of rotary actuators 60, 61, bushings 68 may be omitted.

Also, as shown in FIGS. 7 and 8 (although not expressly labeled in FIG. 7), in some exemplary embodiments cam 66 may include one or more rollers 80. Rollers 80 may comprise, for example, bearings, bushings, substantially cylindrical wheels, and/or other like structures configured to facilitate relative movement between cam 66 and overcenter link 58 while reducing friction and/or wear caused by such relative movement. In exemplary embodiments, rollers 80 may contact a surface of overcenter link 58, and may rotate against and/or otherwise act on this surface as cam 66 rotates. Accordingly, rollers 80 may be moveable relative to cam 66 and overcenter link 58 during rotation of cam 66 against overcenter link 58, and such relative movement may facilitate movement of overcenter link 58 in the first direction to open dipper door 40. As shown in FIG. 6, cam 66 may be positioned on top surface 62 such that at least a portion of cam 66, such as rollers 80 (FIG. 8), may be disposed beneath overcenter link 58 while dipper door 40 is in the closed position. For example, rollers 80 and/or other portions of cam 66 may be disposed between overcenter link 58 and top surface 62 while dipper door 40 is in the closed position.

Figure 9:
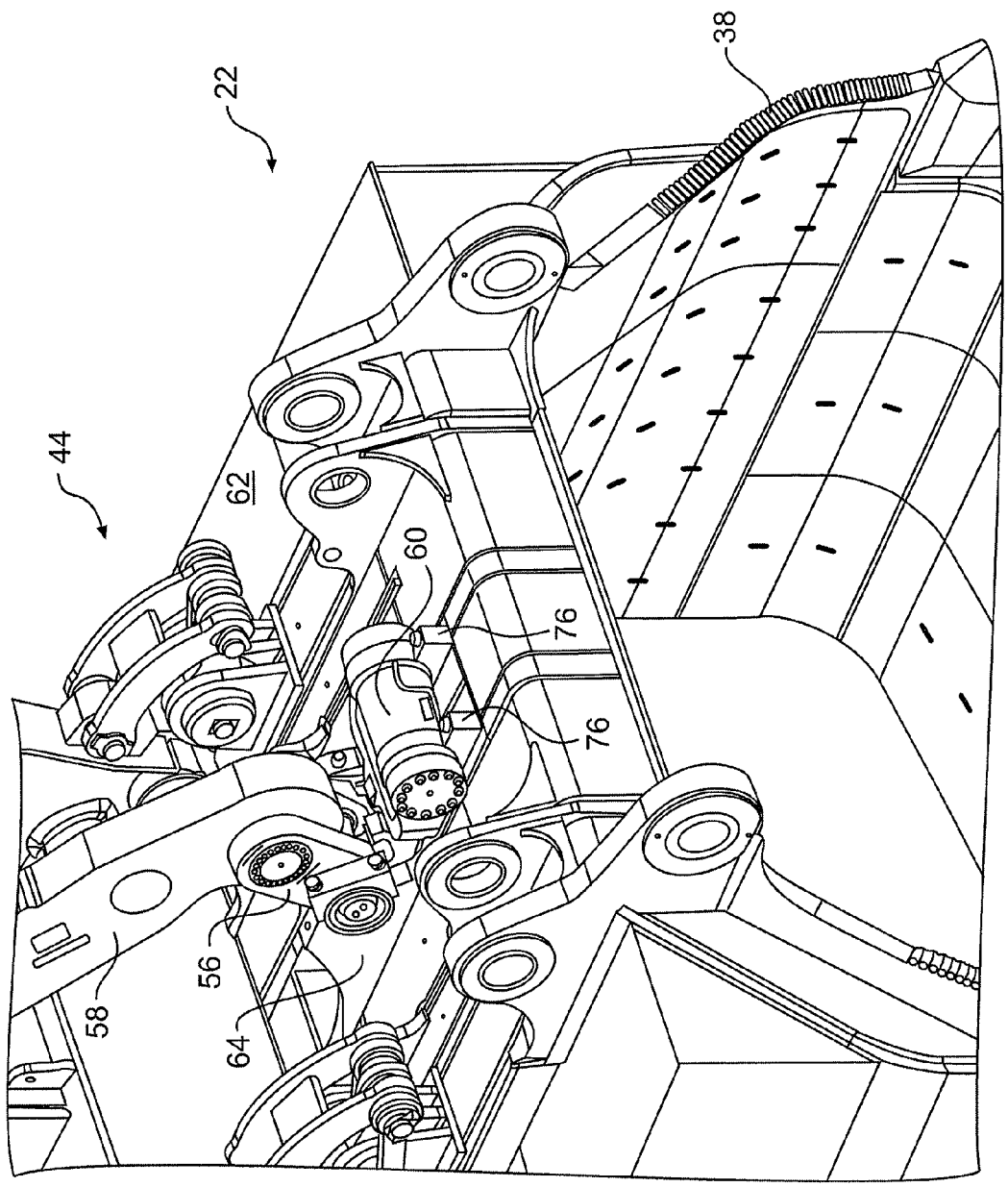

FIG. 9 illustrates an exemplary embodiment of actuator system 44 similar to the embodiments shown in FIGS. 6-8, however, in the exemplary embodiment, of FIG. 9, actuator system 44 includes only a single rotary actuator 60. Rotary actuator 60 may be coupled proximate top surface 62 via one or more brackets, flanges, and/or other like mounts 76, and may be configured to rotate a cam in the clockwise and/or counterclockwise direction against a surface of overcenter link 58 as described above.

Figure 10:
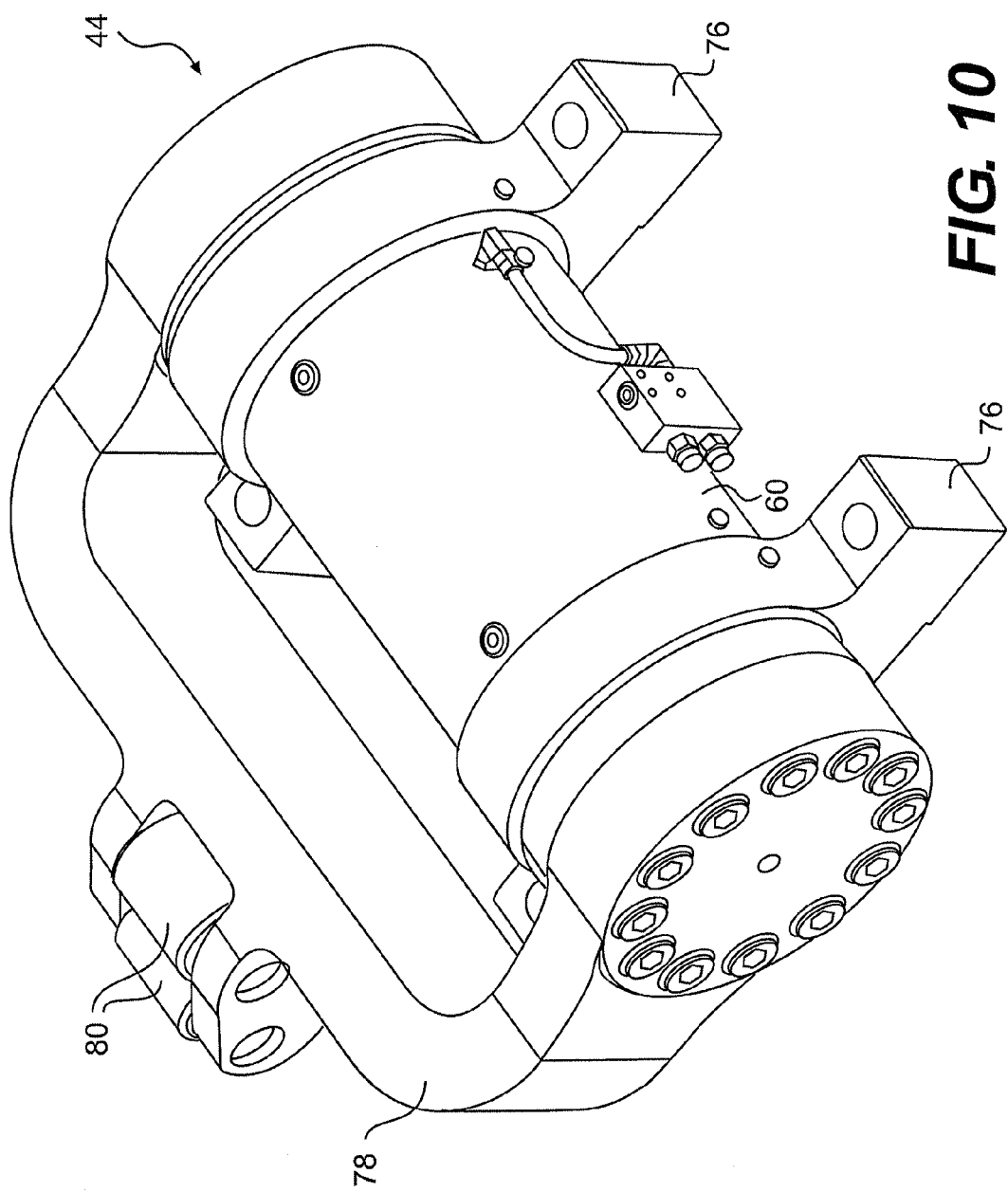
FIG. 10 is another view of a portion of the exemplary actuator system shown in FIG. 9.

FIG. 10 illustrates an exploded view of a portion of the exemplary actuator system 44 shown in FIG. 9. As shown in FIG. 10, in an exemplary embodiment, rotary actuator 60 may be connected to a cam block 78 configured to operate similar to cam 66 of FIGS. 6-8. Cam block 78 may include, for example, a first leg and a second leg opposite the first leg, and in such embodiments, cam block 78 may have a substantially U-shaped configuration. As shown in FIG. 10, rotary actuator 60 may be connected to at least one of the first and second legs of cam block 78. In exemplary embodiments, rotary actuator 60 may be disposed on a first side of cam block 78 adjacent the first leg or, alternatively, on a second side of cam block 78 adjacent the second leg. As shown in FIG. 10, in further exemplary embodiments, actuator 60 may be disposed between first and second legs of cam block 78.

Cam block 78 may comprise one or more rollers 80 similar to those described above with respect to cam 66. For example, rollers 80 of cam block 78 may comprise bearings, bushings, substantially cylindrical wheels, and/or other like structures configured to facilitate relative movement between cam block 78 and overcenter link 58 while reducing friction and/or wear caused by such relative movement. In exemplary embodiments, rollers 80 may contact a surface of overcenter link 58, and may rotate against and/or otherwise act on this surface as cam block 78 rotates. Accordingly, rollers 80 may be moveable relative to cam block 78 and overcenter link 58 during rotation of cam block 78 against overcenter link 58, and such relative movement may facilitate movement of overcenter link 58 in the first direction to open dipper door 40. In exemplary embodiments, cam block 78 may be positioned on top surface 62 such that at least a portion of cam block 78, such as rollers 80, may be disposed beneath overcenter link 58 while dipper door 40 is in the closed position. For example, rollers 80 and/or other portions of cam block 78 may be disposed between overcenter link 58 and top surface 62 while dipper door 40 is in the closed position.

Figure 11:
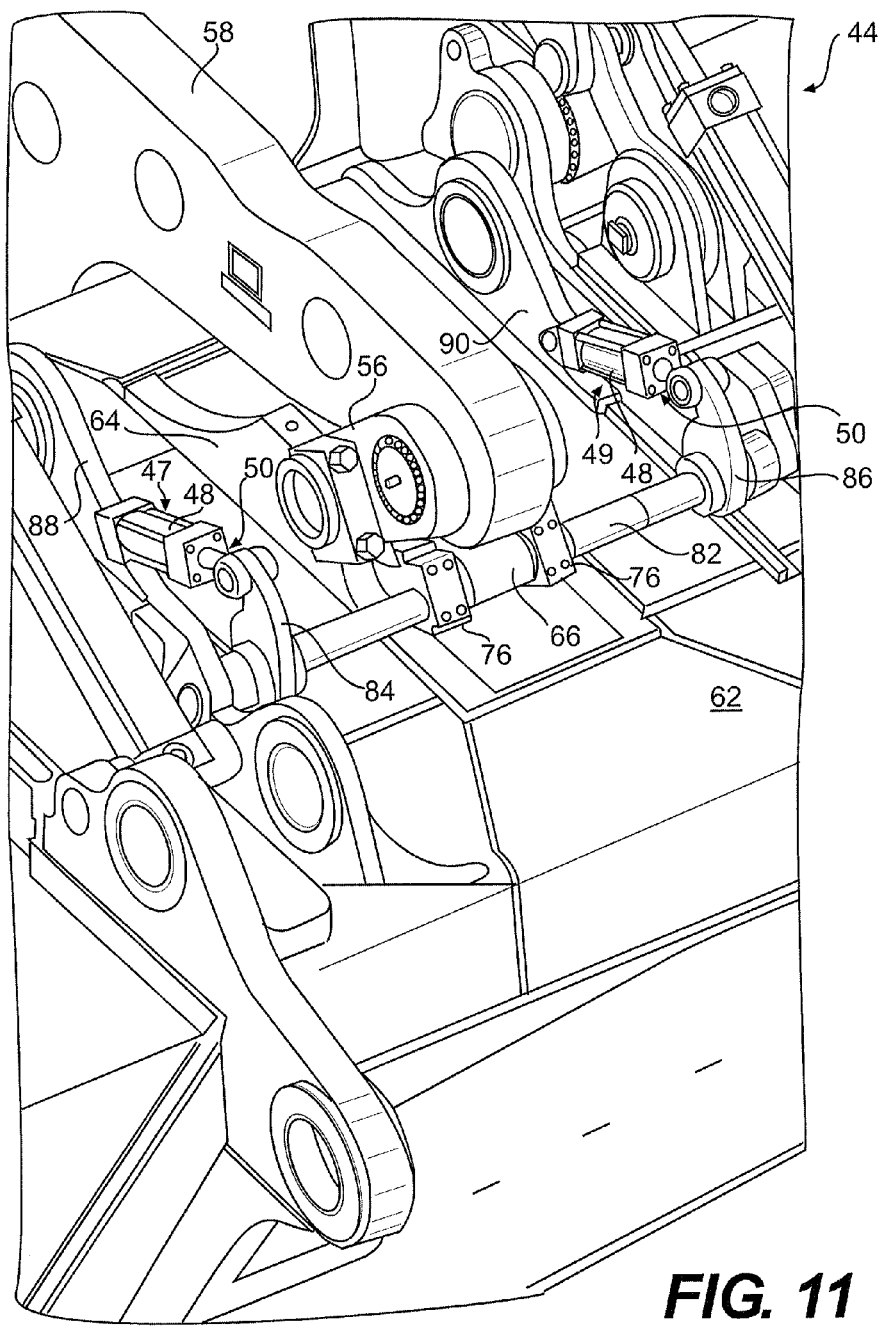

As shown in FIG. 11, in another exemplary embodiment, actuator system 44 may include one or more hydraulic actuators configured to rotate cam 66 against overcenter link 58 to thereby transition dipper door 40 between the closed and open positions, and in the embodiment of FIG. 11, cam 66 may be mounted on a rotatable cam shaft 82. In such embodiments, due to the fixed connection between cam 66 and cam shaft 82, the one or more hydraulic actuators may be configured to rotate cam shaft 82 to affect corresponding rotation of cam 66. For example, as viewed from the perspective of FIG. 11, rotation of cam shaft 82 in the clockwise direction may rotate cam 66 along and/or otherwise against a surface of overcenter link 58. Such movement of cam 66 against overcenter link 58 may cause overcenter link 58 to move in the first direction described above, thereby transitioning dipper door 40 from the closed position to the open position.

In the exemplary embodiment of FIG. 11, the one or more hydraulic actuators may be coupled to cam shaft 82 via respective links 84, 86 mounted on and configured to rotate with cam shaft 82. As shown in FIG. 11, such links 84, 86 may comprise eccentric links similar to eccentric link 56. Due to the fixed connection between links 84, 86 and cam shaft 82, such links 84, 86 may rotate with cam shaft 82 and cam 66 in response to activation of the corresponding hydraulic actuators. In such embodiments, actuator system 44 may comprise one or more rotary actuators 60, 61 or alternatively, as shown in FIG. 11, in such embodiments, actuator system 44 may comprise one or more linear actuators 47, 49 configured to rotate cam shaft 82 and/or cam 66. It is understood that linear actuators 47, 49 may be substantially identical to the linear hydraulic actuators described above with respect to FIGS. 2-4. For example, as shown in FIG. 11, each of linear actuators 47, 49 may include a tube 48 and a piston assembly 50. Although not shown in FIG. 11, each of linear actuators 47, 49 may also include a head-end chamber 52, a rod-end chamber 54, and/or various other fluid control components as described above with respect to FIGS. 2-4. Additionally, in such embodiments, one of tube 48 and piston assembly 50 may be moveably and/or otherwise coupled to cam shaft 82, such as via one of links 84, 86, and the other of tube 48 and piston assembly 50 may be moveably and/or otherwise coupled proximate top surface 62. In such embodiments, the other of tube 48 and piston assembly 50 may be moveably and/or otherwise coupled to a corresponding stationary flange 88, 90 projecting from top surface 62. Such flanges 88, 90 may be similar to flanges 64 described above. As shown in the exemplary embodiment of FIG. 11, tubes 48 of linear actuators 47, 49 may be coupled to respective flanges 88, 90, while piston assemblies 50 of linear actuators 47, 49 may be coupled to respective links 84, 86.

Industrial Applicability

The disclosed dipper actuator systems and associated hydraulic system may be used in any power shovel application where component longevity and reliability are desired. The disclosed actuator systems may have improved longevity and reliability because of the reduction of conventional components (e.g., cables, wires, passages, etc.) that stretch and shrink during dipper handle extensions and retractions. Operation of hydraulic system 46 and actuator system 44 will now be explained.

Referring to FIG. 1, the operator of machine 10 may raise, lower, and tilt tool 22 by causing cables 32 to be reeled in or spooled out. When tool 22 is oriented in the appropriate position (oriented such that the force of gravity generates a clockwise moment on dipper door 40) and the operator of machine 10 desires dipper door 40 of tool 22 to open, the operator may indicate this desire by way of an input device (not shown) located within the cabin of machine 10. A corresponding signal may be generated and wirelessly transmitted to, for example, dipper control valve (not shown) of hydraulic system 46, causing control valve to open. As shown in the exemplary configuration of FIGS. 2 and 3, such control may hydraulically unlock an actuator of actuator system 44 such that, for example, fluid within head-end chamber 52 may be free to flow through supply passage 63 into hydraulic system 46. At this time, the gravitational force acting on dipper door 40 may cause dipper door 40 to rotate away from dipper body 38 and push piston assembly 50 into tube 48. This retraction of piston assembly 50 may effectively reduce the volume of head-end chamber 52, causing fluid to be discharged from dipper actuator 40 at high-pressure. The high-pressure fluid may be collected within hydraulic system 46 for later use. Such dipper door movement and corresponding fluid flow is illustrated in, for example, FIG. 3. In some embodiments, the flow of fluid discharged from head-end chamber 52 may be restricted to some degree to slow and/or cushion the opening movements of dipper door 40. In exemplary embodiments, hydraulically unlocking actuator system 44 as described above may not necessarily result in movement of dipper door 40. Instead, dipper door 40 may only move when tool 22 is oriented to allow gravity to pull dipper door 40 open after actuator system 44 has been unlocked by, for example, movement of the control valve associated with hydraulic system 46.

Dipper door 40 may close any time its orientation is such that gravity pulls dipper door 40 closed (i.e., any time that gravity generates a moment in the counterclockwise direction—as viewed from the perspective of FIG. 4). During the closing movement of dipper door 40, piston assembly 50 may be retracted out of tube 48, thereby increasing the effective volume of head-end chamber 52. This expansion may draw fluid from hydraulic system 46 through supply passage 63 into actuator system 44.

It is understood that the high-pressure fluid collected by actuator system 44 and hydraulic system 46 during, for example, opening of dipper door 44 may be used as a remote power source for other actuators associated with tool 22. The remote and isolated nature of actuator system 44 and hydraulic system 46 may reduce cost and routing complexity, while at the same time improving durability of machine 10.

Additionally, although the above methods of operation of actuator system 44 and hydraulic system 46 have been explained with respect to the hydraulic actuators of FIGS. 2-4, the exemplary embodiments of FIGS. 5-11 may be characterized by substantially similar methods of operation. For example, the fluid communication between hydraulic system 46 and rotary actuator(s) 60, 61 shown in FIGS. 5-10, and between linear actuators 47, 49 shown in FIG. 11, may be substantially identical to that described above with respect to the hydraulic actuators shown in FIGS. 2-4.

It is also understood that although FIGS. 2-4 illustrate high pressure fluid passing from actuator system 44 to hydraulic system 46 during the transition of dipper door from the closed position (FIG. 2) to the open position (FIG. 3), in additional exemplary embodiments, such fluid flow may be reversed. For example, in further embodiments, hydraulic system 46 may be configured to direct pressurized fluid to hydraulic actuators of actuator system 44 to facilitate opening dipper door 40. In particular, in such exemplary embodiments, pressurized hydraulic fluid may be directed to linear and/or rotary hydraulic actuators of actuator system 44 to activate such actuators. Such activation, in response to receipt of pressurized fluid from hydraulic system 46, may be sufficient to move overcenter link 58 in the first direction described above, thereby transitioning dipper door 40 from the closed position to the open position.

It will be apparent to those skilled in the art that various modifications and variations can be made to the disclosed power shovel and dipper actuator. Other embodiments will be apparent to those skilled in the art from consideration of the specification and practice of the disclosed power shovel and dipper actuator. It is intended that the specification and example be considered as exemplary only, with a true scope being indicated by the following claims and their equivalents.

What is claimed is:

1. An actuator system for a machine, comprising:
   a hydraulic actuator connected to a dipper of the machine;
   a hydraulic system fluidly connected to the actuator and configured to selectively direct fluid to the actuator, a component of the hydraulic system being mounted on the dipper; and
   an overcenter link coupled to a door of the dipper and biased to maintain the door in a closed position, wherein the actuator is operable to move the overcenter link in a first direction, thereby transitioning the door from the closed position to an open position.

2. The actuator system of claim 1, wherein the overcenter link is coupled to the dipper via an eccentric link moveably connected to the dipper.

3. The actuator system of claim 2, wherein the actuator comprises a rotary actuator connected to the eccentric link and configured to rotate the eccentric link, wherein rotation of the eccentric link moves the overcenter link in the first direction.

4. The actuator system of claim 2, wherein the eccentric link is coupled to a top surface of the dipper via a flange projecting from the top surface, and wherein the actuator is connected to the flange.

5. The actuator system of claim 1, wherein the overcenter link is connected to the dipper via first and second moveable eccentric links, the actuator comprising a first rotary actuator connected to and configured to rotate the first eccentric link, and a second rotary actuator connected to and configured to rotate the second eccentric link in parallel with the first rotary actuator.

6. The actuator system of claim 1, wherein the actuator is configured to rotate a cam against the overcenter link, and wherein rotation of the cam against the overcenter link moves the overcenter link in the first direction.

7. The actuator system of claim 6, wherein the cam comprises a roller in contact with the overcenter link and rotatable relative to the cam during rotation of the cam against the overcenter link.

8. The actuator system of claim 6, wherein the actuator comprises a first rotary actuator connected to a first side of the cam and a second rotary actuator connected to a second side of the cam, wherein the first rotary actuator is configured to rotate the cam in parallel with the second rotary actuator.

9. The actuator system of claim 6, wherein the cam comprises a cam block having a first leg and a second leg opposite the first leg, the actuator comprising a rotary actuator connected to at least one of the first and second legs and coupled proximate a top surface of the dipper.

10. The actuator system of claim 9, wherein the actuator is disposed between the first and second legs of the cam block, and wherein a portion of the cam block is disposed between the overcenter link and a top surface of the dipper.

11. The actuator system of claim 6, wherein the cam is mounted on a cam shaft and the actuator is configured to rotate the cam shaft to affect rotation of the cam.

12. The actuator system of claim 11, wherein the actuator is coupled to the cam shaft via a link mounted on the cam shaft, the link being configured to rotate with the cam shaft in response to activation of the actuator.

13. The actuator system of claim 12, wherein the actuator comprises a linear actuator having a tube and a piston assembly, one of the tube and the piston assembly being coupled to the cam shaft, and the other of the tube and the piston assembly being coupled proximate a top surface of the dipper.

14. An actuator system for a machine, comprising:
   one of a linear and a rotary hydraulic actuator associated with a dipper of the machine, the dipper comprising a body having a front side including an excavation opening, a back side opposite the front side, a top surface, and a door moveable between a closed position in which the door is disposed adjacent to the back side and an open position in which the door is disposed away from the back side, the one of the linear and the rotary hydraulic actuator being mounted on the top surface,
   the dipper being connected to the machine via a boom extending from the machine, and via a dipper handle pivotally connected to a midpoint of the boom;
   a hydraulic system including a component disposed on the dipper, the hydraulic system being configured to selectively direct fluid to the one of the linear and the rotary hydraulic actuator in response to a control signal received from an operator of the machine;
   an overcenter link connected to the door; and
   an eccentric link connected to the overcenter link and the top surface, wherein selectively directing fluid to the one of the linear and the rotary hydraulic actuator moves the eccentric link and the overcenter link relative to the body, and transitions the door between the open and closed positions.

15. The actuator system of claim 14, wherein selectively directing fluid to the one of the linear and the rotary hydraulic actuator releases or locks pivoting movement of the door.

16. The actuator system of claim 14, wherein the eccentric link comprises a first eccentric link and the one of the linear and the rotary hydraulic actuator comprises a first rotary actuator connected to and configured to rotate the first eccentric link,
   the system further comprising a second eccentric link connected to the overcenter link and the top surface, and a second rotary actuator connected to and configured to rotate the second eccentric link in parallel with the first rotary actuator.

17. The actuator system of claim 14, wherein the one of the linear and the rotary hydraulic actuator comprises a rotary actuator configured to rotate a cam against the overcenter link to thereby transition the door from the closed position to the open position.

18. The actuator system of claim 17, wherein the cam comprises a cam block having a first leg and a second leg opposite the first leg, the rotary actuator being connected to at least one of the first and second legs, and a portion of the cam block being disposed between the overcenter link and the top surface.

19. The actuator system of claim 14, wherein the one of the linear and the rotary hydraulic actuator comprises a linear actuator configured to rotate a cam shaft coupled to the linear actuator via a link mounted on the cam shaft, wherein rotation of the cam shaft rotates a cam coupled to the camshaft against the overcenter link to thereby transition the door from the closed position to the open position.

20. A method of operating a machine, comprising:

selectively directing fluid between a hydraulic system, having a component disposed on a dipper of the machine, and a hydraulic actuator disposed on the dipper, wherein selectively directing fluid between the hydraulic system and the hydraulic actuator activates the hydraulic actuator; and moving an overcenter link, in response to activation of the hydraulic actuator, in a first direction to transition a door of the dipper connected to the overcenter link to an open position in which the door is disposed away from a body of the dipper, wherein activation of the hydraulic actuator overcomes a biasing force maintaining the door in a closed position in which the door is disposed adjacent to the body.

\* \* \* \* \*